No. 608,127. Patented July 26, 1898.
J. P. ISLEV-PETERSEN.
FILTER.
(Application filed Sept. 13, 1897.)
(No Model.) 2 Sheets—Sheet 1.

WITNESSES:

INVENTOR
Jens P. Islev-Petersen
BY
ATTORNEYS.

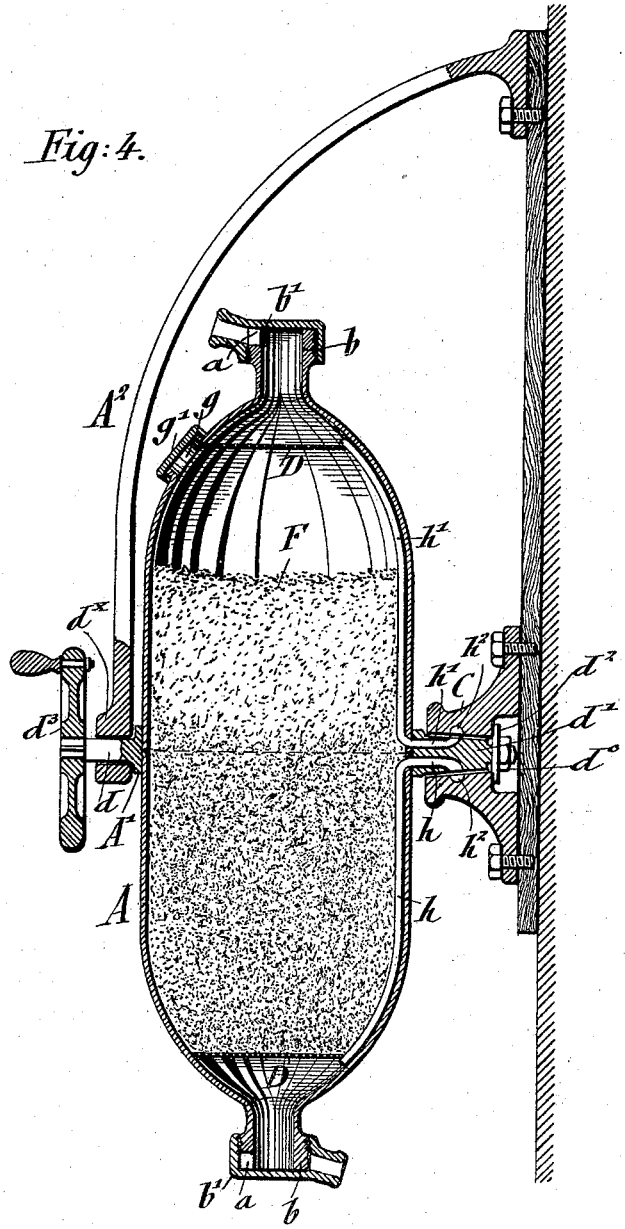

UNITED STATES PATENT OFFICE.

JENS P. ISLEV-PETERSEN, OF NEW YORK, N. Y.

FILTER.

SPECIFICATION forming part of Letters Patent No. 608,127, dated July 26, 1898.

Application filed September 13, 1897. Serial No. 651,468. (No model.)

*To all whom it may concern:*

Be it known that I, JENS P. ISLEV-PETERSEN, a citizen of the Kingdom of Denmark, residing at New York, (Brooklyn,) in the county of Kings and State of New York, have invented certain new and useful Improvements in Filters, of which the following is a specification.

This invention relates to certain improvements in filters for purifying water for drinking and other purposes, the filter being so constructed that a thorough washing of the filtering material in the same is readily obtained without removing the filtering material for cleansing, as the same is cleansed partly by passing the water in a direction opposite to the usual direction through the same and partly by the tilting of the body of filtering material, so that by the friction of the particles the adhering impurities are removed and adapted to be carried off by the countercurrent that is passed through the filtering mass.

The invention consists of a filter which comprises a centrally-pivoted vessel provided with outlet-openings and discharge-nozzles at the opposite ends, stationary screens near said discharge-nozzles, a mass of filtering material less in quantity than the size of the space between the screens, channels arranged in the central trunnion of the vessel and extending along the inner walls of the same in opposite directions toward and through the screens, a two-way cock, channels between said two-way cock and said trunnion and a pipe for supplying water through the two-way cock, as will be fully described hereinafter and finally pointed out in the claims.

Figure 1:
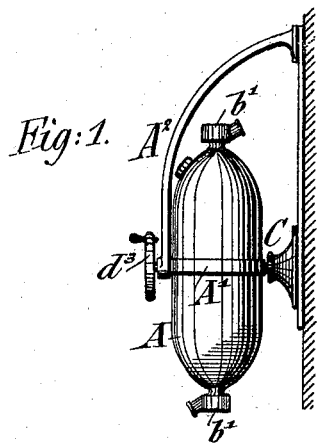
Figure 3:
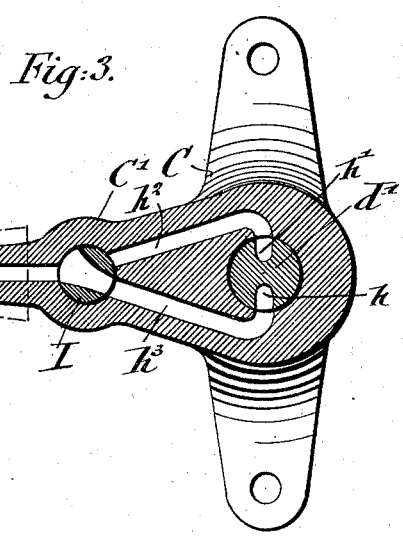
Figure 2:
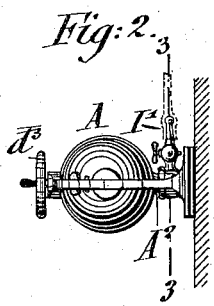

In the accompanying drawings, Figure 1 represents a side elevation of my improved filter for purifying water for drinking and other purposes, showing it in normal position for filtering. Fig. 2 is a top view of the same. Fig. 3 is an enlarged front elevation, partly in section, on line 3 3, Fig. 2, of the supporting-bracket for the filtering vessel, showing the two-way cock by which the water is supplied to the interior of the filter; and Fig. 4 is a vertical central section of the same drawn on a larger scale, showing the filter in position for cleansing the filtering material.

Similar letters of reference indicate corresponding parts.

Referring to the drawings, A represents a filtering vessel, which is preferably made of copper or other suitable metal, of cylindrical shape with tapering ends. The vessel A is provided at the opposite ends with screw-threaded necks $b$, which are provided with outlet-openings $a$ at one side. Onto the necks $b$ are screwed discharge-nozzles $b'$, which when moved into forward position permit the discharge of the water from the interior of the filter and which when turned into backward position close the opening in the bushing, so that no water can escape through the nozzle.

The filtering vessel A is reinforced at its center by a strong ring or band A', which is provided at diametrically opposite points with stationary pivots or trunnions $d\ d'$, the outer one $d$ of which is provided with a hand-wheel or crank $d^3$, while the inner one is made of conically-tapering shape and provided with a small threaded shank at its end for receiving a nut $d^0$ and washer $d^2$, by which the inner pivot or trunnion $d'$ is attached to a supporting-socket C, which is provided with a tapering bearing corresponding in size and shape with the trunnion $d'$, so that it fits snugly in the same. The inner surface of the pivot-bearing, as well as the surface of the trunnion $d'$, are ground, so that a perfect fit of the parts is obtained and the leaking of water prevented.

At the interior of the filtering vessel A are arranged, near the outlet-openings $a$, stationary screens D, between which the mass of filtering material F is placed. Nearly opposite one stationary screen D is arranged a charging-opening $g$ and screw-cap $g'$, through which opening the filtering material is introduced to the interior of the vessel A and through which from time to time, if necessary, some chemical substance, such as a suitable acid or alkali, can be introduced when required for the thorough cleansing of the body of filtering material in the vessel A. The outer trunnion $d$ of the vessel A is supported by a strap A², that is attached to the same wall-board to which the socket C is attached and that extends in a curve over the top part of the vessel A, said strap having an eye $d^\times$ at its lower end for the trunnion, so that the filter can be readily tilted by means of the hand-wheel or crank $d^3$, applied to the outer end of the trunnion $d$ in front of the eye $d^\times$ at the lower end of the strap. The filtering material is not tightly packed in the space between the screens D, but fills up only about three-fourths or four-fifths of the space between the screens. The filtering material must be coarser than the openings in the screens, so that no particles of the same can be forced through the screens. The filtering material consists, preferably, of several different substances—such as sand and small lumps of charcoal, coarse bone-black, pumice-stone, or other substances—provided that they are of different specific gravities, so that they can readily reassume their position by gravity after each reversal of the filter. The inner trunnion $d'$ is provided at opposite sides with channels $h\ h'$, which pass through the same and extend in opposite directions along the interior of the filtering vessel A to and beyond the stationary screens D, as shown clearly in Fig. 4. The ends of the channels $h\ h'$ communicate with two channels $h^2\ h^3$, which are controlled by the two-way cock I, that is arranged in a laterally-extended portion C' of the socket, which terminates in a nipple I', that is provided with a swelling at its end, so as to readily receive and attach a rubber tube by which the connection with the water-supply faucet is made. The two-way cock I is set in position, so that the nipple I' communicates either with the upper or lower supply-channel $h^2$ or $h^3$, it being for filtering connected with the upper channel, so that the water passes through the cock and the upper channel $h^2$ in the trunnion into the upwardly-extending interior channel $h'$ to the upper part of the filtering vessel, then through the upper screen and the body of the filtering material into the lower part and to the outside for use. When it is desired to cleanse the filtering material, the position of the two-way cock is changed, so that the water flows through the lower channel in the trunnion $d'$ and the lower interior channel $h$ in the filtering vessel to the lower part of the same, then in a counter-current to its former flow through the body of filtering material to the upper end of the same, and out through the discharge-nozzle at the upper end, in which case, however, the lower nozzle must be placed in closed and the upper in open position. In this manner the filtering material would be washed by a change in the direction of the flow of water. This, however, is not sufficient to remove the impurities that are retained by all the particles of the filtering material, and in order to produce the more thorough cleansing of the filtering material the filter is reversed, whereby the entire body of filtering material is slowly shifted from one screen to the other, and as the water enters through the lower channel in opposite direction to its former flow through the filtering material a rearrangement of the particles of the filtering material takes place, inasmuch as the heavier and finer filtering material, such as sand, gradually works its way down through the coarser and lighter particles of filtering material, such as charcoal, which latter group themselves again in a layer over the body of heavier filtering material. This regrouping of the layers of filtering material between the screens by the action of the water flowing simultaneously through said layers produces the thorough washing and cleansing of the filtering material, inasmuch as not only the relative position of the particles of the filtering material toward each other is changed, but also by the friction between the particles of filtering material the adherence of the impurities to the same is discontinued, so that they are readily removed by the action of the water and carried off. According to the condition of the water to be filtered the cleansing of the filtering material has to be accomplished more or less frequently. Ordinarily it would only be necessary to reverse the filter on its axis, say, once every day and change the relative positions of the spouts without changing the position of the two-way cock, in which case merely the shifting of the filtering material in the vessel is produced simultaneously with the washing action of the water, which flows in the same direction as when filtering through the same. By permitting the water to flow thus for some time through the filter the filtering material is sufficiently cleansed. The filter then remains in this position for drawing off filtered water. Whenever, however, a thorough cleansing action is required, the position of the two-way cock is changed and the filter reversed as before described, whereby the layers of filtering material are regrouped by the flow of the water in opposite direction through the same.

My improved filter is adapted to be made in smaller sizes for domestic purposes, while larger sizes may be used for filtering larger quantities of water for drinking and other purposes and may be used for restaurants, hotels, and other uses.

Having thus described my invention, I claim as new and desire to secure by Letters Patent—

1. A filter, composed of a pivoted reversible vessel provided with discharge-openings and nozzles at the ends, screens arranged near said discharge-openings, a mass of filtering material arranged between the screens without filling the entire space of the same so as to permit the shifting of the filtering material when reversing the filtering vessel, channels for supplying the water through a trunnion of the vessel to either end thereof, and means for controlling either channel, substantially as set forth.

2. A filter composed of a reversible filtering vessel provided with discharge-openings and nozzles at the ends, screens arranged near said discharge-openings, and a mass of filtering material composed of two or more substances respectively having different specific gravities, said filtering material being of such quantity as not to fill the entire space between the screens, for permitting the shifting of the filtering material, substantially as set forth.

3. The combination of a filtering vessel provided with central trunnions, means for supporting said trunnions for permitting the reversing of the filtering vessel, discharge-nozzles at the opposite ends of the filtering vessel, screens arranged near said discharge-nozzles, channels extending through one of the trunnions of the vessel and at the interior of the vessel, in opposite directions, to and through the screens, a two-way cock arranged in the supporting-socket of the channeled trunnion, channels in said socket that connects with the channels in the trunnion, and a supply-nipple connecting with the two-way cock, substantially as set forth.

4. A filter, consisting of a reversible filtering vessel provided with a filtering medium and channels for conducting the liquid to be filtered to said filtering medium, necks projecting from the ends of the vessel and provided with discharge-openings, and movable discharge-nozzles fitted to said necks for opening or closing the discharge-openings, substantially as set forth.

In testimony that I claim the foregoing as my invention I have signed my name in presence of two subscribing witnesses.

JENS P. ISLEV-PETERSEN.

Witnssees:
PAUL GOEPEL,
M. H. WURTZEL.